March 12, 1963 W. G. WEBSTER ETAL 3,080,885
VARIABLE AREA VALVE
Filed April 25, 1960

INVENTORS
WILLIAM G. WEBSTER
HAROLD C. SIMMONS
BY
Oberlin, Maky & Donnelly
ATTORNEYS

United States Patent Office 3,080,885
Patented Mar. 12, 1963

3,080,885
VARIABLE AREA VALVE
William G. Webster, Chagrin Falls, and Harold C. Simmons, South Euclid, Ohio, assignors to Parker-Hannifin Corporation, Cleveland, Ohio, a corporation of Ohio
Filed Apr. 25, 1960, Ser. No. 24,395
8 Claims. (Cl. 137—471)

The present invention relates generally as indicated to a variable area valve and, more particularly, to such valve adapted for use as in conjunction with fuel injection nozzles for gas turbine power plants and the like. The present invention also relates to a flow control valve or multi-port distributor for accurately metering prescribed amounts of fuel to each of several nozzles.

It is a principal object of this invention to provide a variable area valve, or flow control valve characterized by having a flow versus pressure curve which is initially of moderate slope from zero to about one-third to one-half of the full desired flow while the pressure is increased from about three-fourths of the maximum pressure up to the maximum pressure and which thereafter is of opposite slope so that full flow is achieved at say, one-fourth of the maximum pressure.

It is another object of this invention to provide a flow control valve of the character indicated which employs a spring-closed valve member and is provided with primary and secondary restrictions which are respectively effective to be the principal controlling factors in the establishment of the desired flow versus pressure curve i.e. the primary restriction is the controlling factor in the establishment of the moderate increase in fluid flow from the outlet in accordance with increase in fluid pressure so as to provide for accurate metering and sensitivity of flow to pressure variation during the initial portion of the opening of the valve, and the secondary restriction is the controlling factor to provide a much increased flow at lower pressure during the terminal portion of the opening of the valve.

It is another object of this invention to provide a flow control valve as above referred to, in which the aforesaid primary restriction, in relation to opening movement of the valve member in uniform increments, is shaped to initially increase the outlet flow area in uniform increments and then to increase the outlet flow area in progressively increasing increments, whereby the flow versus pressure curve starts out as a substantially straight line and after the point is reached where the accurate metering and sensitivity to pressure variation afforded by the straight line portion is not required, the curve commences to flatten or level out to provide for continued increased flow with less increase in inlet pressure.

It is another object of this invention to provide a flow control valve as above referred to in which the aforesaid secondary restriction is variable at a rate over and above that due to the progressively increasing flow of the fuel to the extent that the remainder or terminal portion of the flow versus pressure curve reverses its slope to provide a continued and much increased flow with lower inlet pressures than required during the initial metering range.

It is another object of this invention to provide a flow control valve of the character indicated which embodies a novel filtering system which ensures that even the minute particles of foreign matter in the previously filtered fuel cannot gain access between the axially slidable valve member and the sleeve or casing in which it is thus slidably mounted, whereby the valve member will at all times be able to move smoothly without sticking so as to be accurately responsive to small pressure changes especially during the time that the fuel metering operation is of critical importance, and also during the time that it is desired to provide full flow at minimum pressure.

It is another object of this invention to provide a flow control valve of the character indicated which is especially adapted for use as a multi-port distributor to supply equal quantities of fuel to each of several injection nozzles.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
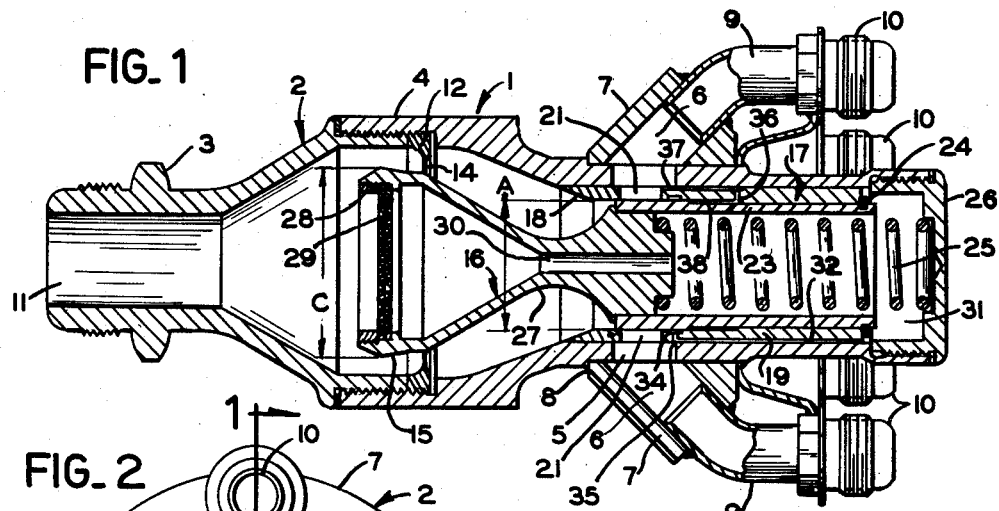
FIG. 1 is a longitudinal cross-section of one form of flow control valve constituting the present invention, such section having been taken substantially along the line 1—1, FIG. 2 and showing the valve in closed position.
Figure 2:
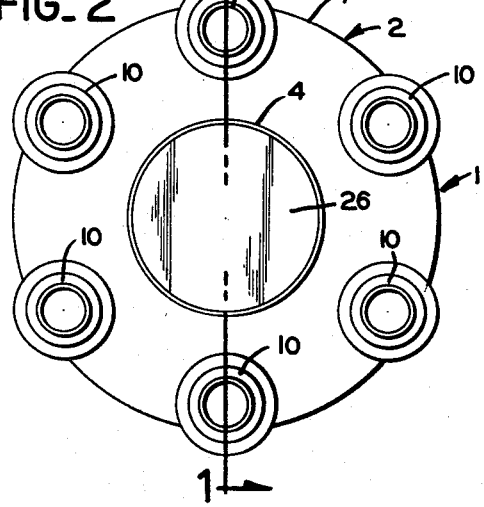
FIG. 2 is an end elevation view of the flow control valve or multi-port distributor herein as viewed from the right-hand end of FIG. 1.

Referring now in detail to the drawings, the flow control valve or multi-port distributor 1 herein shown, comprises a multi-part casing 2 including the inlet section 3 which is screwed into the outlet section 4, the outlet section 4 having a series of radial openings 5, herein six in number, through the wall thereof leading into corresponding openings 6 formed in the distributor housing section 7, the latter being brazed or otherwise secured on the outlet section 4 against the shoulder 8 thereof. Brazed or otherwise secured in the openings 6 of the distributor housing section 7 are short curved tubes 9 having threaded tube connectors 10 at their ends, said connectors 10 preferably being uniformly spaced around the axis of the outlet section 4 and having their axes parallel to the axis of the outlet section 4. A set of six fuel injection nozzles (not shown) are adapted to be coupled to the respective connectors 10 for flow of fuel from the inlet port 11 of the inlet section 3 through the respective openings 5 and 6 formed in the outlet section 4 and in the distributor housing section 7.

The inlet section 2 provides, as aforesaid, the fuel inlet port 11 which flares out as shown and has brazed or otherwise secured thereto, a ring 12 of stainless steel or the like forming an annular orifice 14 with the tapered head 15 of the movable valve member 16 through which the fuel flows from the inlet port 11 to the outlet ports 5 and 6. The ring 12 has a short circular bore with a generally conical curved approach and a nearly normal exit which is slightly tapered as shown.

The flow control member 17 herein shown, comprises a sleeve press-fitted in outlet section 4 and thus constitutes a portion of the casing 2. Said sleeve 17 is preferably made in two tubular parts 18 and 19 which are brazed together along the line 20 (see FIG. 4) perpendicular to the common central axis thereof. The part 19 is formed with a plurality of metering ports 21 which are smaller than and register with the respective openings 5 and 6 in the outlet section 4 and in the distributor housing section 7. Said metering ports 21, as hereinafter described in detail, each constitute a primary restriction to achieve the desired ends of the invention.

Figure 4:
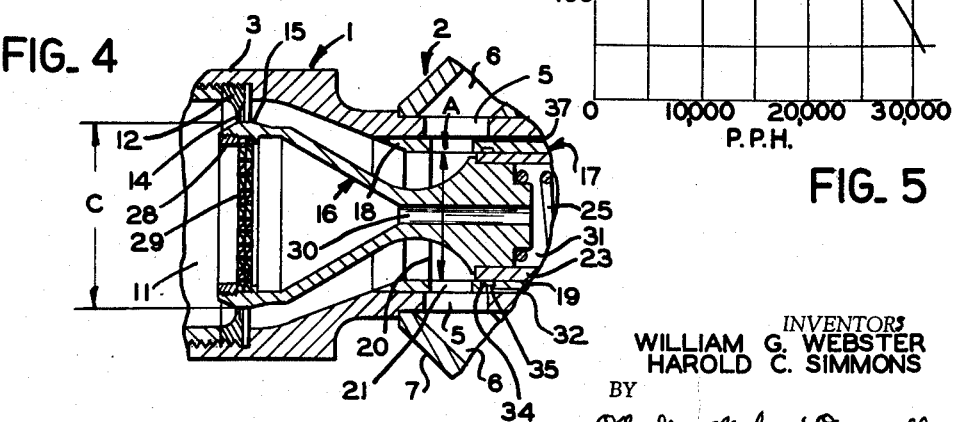
FIG. 4 is a fragmentary cross-section view similar to FIG. 1 except showing the movable valve member in open position.

The composite valve member 16 includes a guide and metering section 23 which is slidable in the sleeve 17 and which, in the closed position of said valve member, covers the metering ports 21 as best shown in FIG. 1. That position of the valve member 16 is determined by the stop shoulder formed by the snap ring 24 engaging the outer end of the sleeve 17, the compression spring 25 which is backed up by a plug 26 screwed into the outlet section 4 being effective normally to urge the valve member 16 to closed position. Secured in the metering section 23 of the valve member 16 is the spool-like head 15 and when said valve member is in open position, as shown in FIG. 4, the neck 27 thereof provides for smooth flow of fuel between the conical surfaces (of different apex angles as shown) of the head 15 and outlet section 4 to the several metering ports 21.

It is to be noted that the head 15 is hollow and has mounted therein as by the threaded ring 28, at its large inlet end, very fine filters 29 which are effective to filter out minute particles of foreign matter from the fuel which, of course, has previously been filtered through a somewhat coarser filter to filter out particles that might otherwise clog the nozzles. The fuel under pressure in the inlet port 11 which passes through these fine filters 29 enters the valve head 16 and flows through the passage 30 thereof into the chamber 31 defined by the guide section 23 and the spring backup plug 26. From such chamber 31, the finely filtered fuel is conducted through a pair of diametrically opposite grooves 32 formed in the outer surface of the sleeve 17 into an internal groove 34 therein by way of corresponding orifices 35. The finely filtered fuel then flows axially in both directions from such chamber or groove 34 between the sliding surfaces of a valve member 16 and surrounding sleeve 17, the pressure of this fuel being substantially greater than that of the fuel flowing around the outside of the head 15 and through the metering ports 21 and outlet holes 5 and 6 of the outlet section. The sleeve 17 also has a pair of orifices 36 and grooves 37 for relieving the chamber 38. With this arrangement only the finely filtered fuel is present in the areas where there is sliding or rubbing contact between the valve member 16 and its surrounding sleeve 17.

Figure 3:
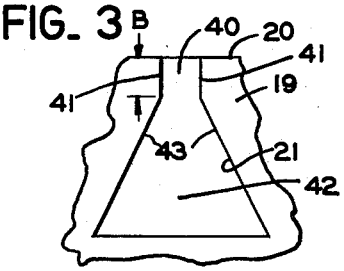
FIG. 3 is an enlarged plan view of one of the several identical outlet or distributor ports.

Referring in greater detail to the outlet metering ports 21, the same are preferably formed as notches or slots in the square inner end of the sleeve part 19 and they each include as best shown in FIG. 3 a neck portion 40 with initial parallel sides 41 and an adjacent portion 42 with diverging sides 43. It can be seen that as the square end of the guide section 23 of the valve member 16 is moved to progressively uncover these metering ports 21 each increment of movement will enlarge the outlet ports 21 in direct proportion to the increment of such movement and, of course, the coil spring 25 follows Hooke's Law, whereby after the initial compression of the spring 25 has been overcome each predetermined increase in pressure acting on the area A of the valve member 16 will cause a uniform increment of uncovering of the metering ports 21.

Figure 5:
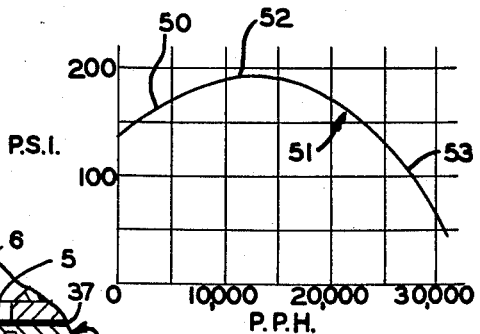
FIG. 5 is a flow versus pressure curve obtainable with the flow control valve herein.

Thus, the portion 50 of the curve 51 shown in FIG. 5 from zero flow to a flow of about 8,000 to 10,000 pounds per hour (p.p.h.) is nearly a straight line with pressure increasing from about 140 p.s.i. to about 185 to 190 p.s.i. After such initial opening movement of the valve member 16, each increment of movement thereof will cause a greater increment of flow area increase of the metering ports 21 in the diverging regions 42 thereof and this is where the portion 52 of the curve 51 of FIG. 5 has a progressively decreasing slope, that is, from say, about 9,000 p.p.h. to about 13,000 to 14,000 p.p.h. while it is only required to increase the fuel pressure from about 190 p.s.i. to 195 p.s.i. These metering ports 21 as thus uncovered by the valve member 16 constitute the primary restriction of the flow control valve or multi-port distributor 1 herein and after the initial control by such primary restriction, then the secondary restriction 14 takes over the control of the flow versus pressure characteristics of the valve herein. Such secondary restriction 14 (constituted by the radial space defined between the bore of the ring 12 and the externally tapered head 15) provides a progressively decreasing flow area as the valve member 16 continues its opening movement.

In the example given in FIG. 5 the secondary restriction 14, by reason of its gradual reduction in flow area is principally accountable for the portion 53 pressure versus flow curve 51 sharply reversing its slope from about say 14,000 to 15,000 p.p.h. up to 30,000 p.p.h., in which flow range, fuel inlet pressure has decreased from the maximum of about 195 p.s.i. to about 60 p.s.i., whereby a maximum fuel pressure is made available for the gas turbine with a minimum inlet pressure.

It is to be noted that the variable secondary restriction 14 serves as a transition means whereby, after initial metering by the primary variable restriction (the metering ports 21), the pressure drop of the fuel across the secondary restriction 14 acting on the area C of the valve member 16 causes a pronounced increase in the rate of fuel flow even though the inlet fuel pressure is much less than what it was during the initial opening movement. To achieve these results as depicted in FIG. 5 area C should be 1½ to 3 times that of A while the ratio of the area of the primary restriction to the minimum area of the secondary restriction should be about 1:1 to about 3:1.

By way of example, each of the metering ports 21 may have a neck portion 40 of .062" width across the sides 41 and a length B of .060" and a diverging portion 42 which is .514" across the base and .440" from the neck 40 to the base (approximately .130 sq. in. for each port 21). On the other hand the minimum cross-section area of orifice 14, when the valve member 16 is in the FIG. 4 position, is .63 sq. in. Thus, for the FIG. 5 curve 51 the flow area of the six metering ports 21 is .780 sq. in. as compared with .63 sq. in. for the minimum of the secondary orifice 14, a ratio of 1.2:1. Furthermore, diameter C may be, say 2.0" and diameter A may be, say, 1.40", an area ratio of C:A of about 2:1.

In general, when the flow control valve 1 herein is in fully open condition the pressure drop across the secondary restriction, that is, the annular orifice 14, is a little more than twice the pressure drop across the primary variable restriction, that is, the metering ports 21. Specifically, when the pressure drop is 50 p.s.i. as represented at the terminal end of the curve 51 in FIG. 5 there will be about a 15 p.s.i. pressure drop across the metering ports 21 and about 35 p.s.i. pressure drop across the annular orifice 14.

Other modes of applying the principle of the invention may be employed, change being made as regards the details described, provided the features stated in any of the following claims, or the equivalent of such, be employed.

We therefore particularly point out and distinctly claim as our invention:

1. A flow control valve comprising a casing having an inlet port for fluid under pressure, and an outlet port; and a spring closed valve member movable in said casing to open communication between said inlet port and said outlet port; said valve member having a first area exposed to the fluid pressure in said inlet port effective to progressively open said valve member against spring pressure acting thereon and thereby provide for progressive increase in flow from said outlet port as the pressure acting on said first area increases; said valve member and casing including means forming a restricted passage through which the fluid flows from said inlet port to said outlet port as said valve member is opened; said valve member having a second larger area which is acted upon by fluid under pressure on the upstream side of said restricted passage; said restricted passage being progressively decreased in flow area by progressive opening movement of said valve member as aforesaid and thus having a progressively increasing pressure drop over and above that due to the progressively increasing flow of fluid therethrough such that fluid pressure acting on said second area builds up to effectively move said valve member against the spring pressure at a rate such that, after a substantial flow of fluid has been established by a progressive rise in fluid pressure acting on said first area, continued increase in flow of fluid is achieved despite a decrease in fluid pressure in said inlet port.

2. The valve of claim 1 wherein said restricted passage means is annular and is defined by radially spaced surfaces of said casing and said valve member of which the surface of said valve member is of generally frusto-conical form to progressively decrease the flow area of said restricted passage during the opening movement of said valve member.

3. The valve of claim 1 wherein said outlet port and valve member are shaped to form a primary variable restriction which, in relation to uniform increments of opening movement of said valve member, increases the flow area of said outlet port successively in uniform increments and then in progressively increasing increments.

4. The valve of claim 1 wherein said valve member is slidable in said casing; and wherein an extremely fine filter is provided through which a portion of the fluid in said inlet port passes for flow between the sliding surfaces of said casing and valve member to said outlet port.

5. A flow control valve comprising a casing having an inlet port for fluid under pressure, and an outlet port; and a spring closed valve member movable in said casing to open communication between said inlet port and said outlet port; said valve member having a first area exposed to the fluid pressure in said inlet port tending to open said valve member against spring pressure acting thereon; said valve member and casing defining a variable restricted passage which progressively decreases in flow area by progressive opening movement of said valve member and through which the fluid flows with progressively increasing pressure drop from said inlet port to said outlet port as said valve member is opened; said valve member having a second larger area which is acted upon by fluid under pressure on the upstream side of said restricted passage; the ratio of said second area to said first area being from about 1½:1 to about 3:1 which, in conjunction with the spring pressure and with said restricted passage, establishes a pressure drop through said flow control valve that successively progressively increases and decreases as the flow of fluid from said inlet port to said outlet port via said restricted passage progressively increases.

6. A valve assembly comprising a casing formed with a passage for flow of fluid therethrough; and a spring-seated fluid pressure actuated valve member movable in said casing to open and close such passage; said valve member and casing defining a primary variable restriction which has a progressively increasing flow area as said valve member is opened under the influence of fluid pressure acting on a first area thereof; said valve member and casing also defining a secondary variable restriction which has a minimum flow area from about 1:3 to about 1:1 of the maximum flow area of said primary restriction, and which has a progressively decreasing flow area as said valve member is opened under the influence of fluid pressure acting on a second larger area thereof from about 1½:1 to about 3:1 with respect to said first area; said primary and secondary restrictions and said first and second areas being interrelated as aforesaid to establish a pressure versus flow curve through said passage characterized by an initial increase in flow in proportion to increase in the pressure acting on said first area and a subsequent increase in flow despite a decrease in the pressure acting on said second area.

7. The valve assembly of claim 6 wherein said casing has an inlet at one end and a plurality of radial outlets adjacent the other end; said valve member being arranged to progressively uncover such outlets and thereby form said primary restriction as said valve opens; such outlets terminating in a circular series of parallel connectors adapted for connection with a set of injection nozzles.

8. A flow control valve comprising a casing having an inlet port for fluid under pressure, and an outlet port; and a spring closed valve member movable in said casing to open communication between said inlet port and said outlet port; said valve member having a first area exposed to the fluid pressure in said inlet port tending to open said valve member against spring pressure acting therein; said valve member and casing defining a variable restricted passage through which the fluid flows with progressively increasing pressure drop from said inlet port to said outlet port as said valve member is opened; said valve member having a second larger area which is acted upon by fluid under pressure on the upstream side of said restricted passage; said restricted passage and said first and second areas of said valve member being interrelated to provide a fluid flow versus fluid pressure curve which initially has a moderate slope to control flow through said outlet port according to the fluid pressure rise in said inlet port and which thereafter has an opposite slope to establish a much increased flow from said outlet port at relatively lower pressure acting on said second area; said restricted passage constituting a secondary variable restriction; said valve member and casing defining a primary variable restriction which is shaped to provide, in relation to uniform increments of opening movement of said valve member, an increasing flow area successively in uniform increments and then in progressively increasing increments.

References Cited in the file of this patent

UNITED STATES PATENTS

| 552,202 | Scott | Dec. 31, 1859 |
|---|---|---|
| 1,713,115 | Cousino | May 14, 1929 |
| 2,724,239 | Fox | Nov. 22, 1955 |
| 2,826,216 | Thomas | Mar. 11, 1958 |
| 2,832,641 | Korda | Apr. 29, 1958 |
| 2,969,084 | Raymond | Jan. 24, 1961 |
| 2,993,506 | Hillman | July 25, 1961 |